F. L. CROSS.
TROLLEY POLE.
APPLICATION FILED JULY 6, 1909.
981,535.
Patented Jan. 10, 1911.
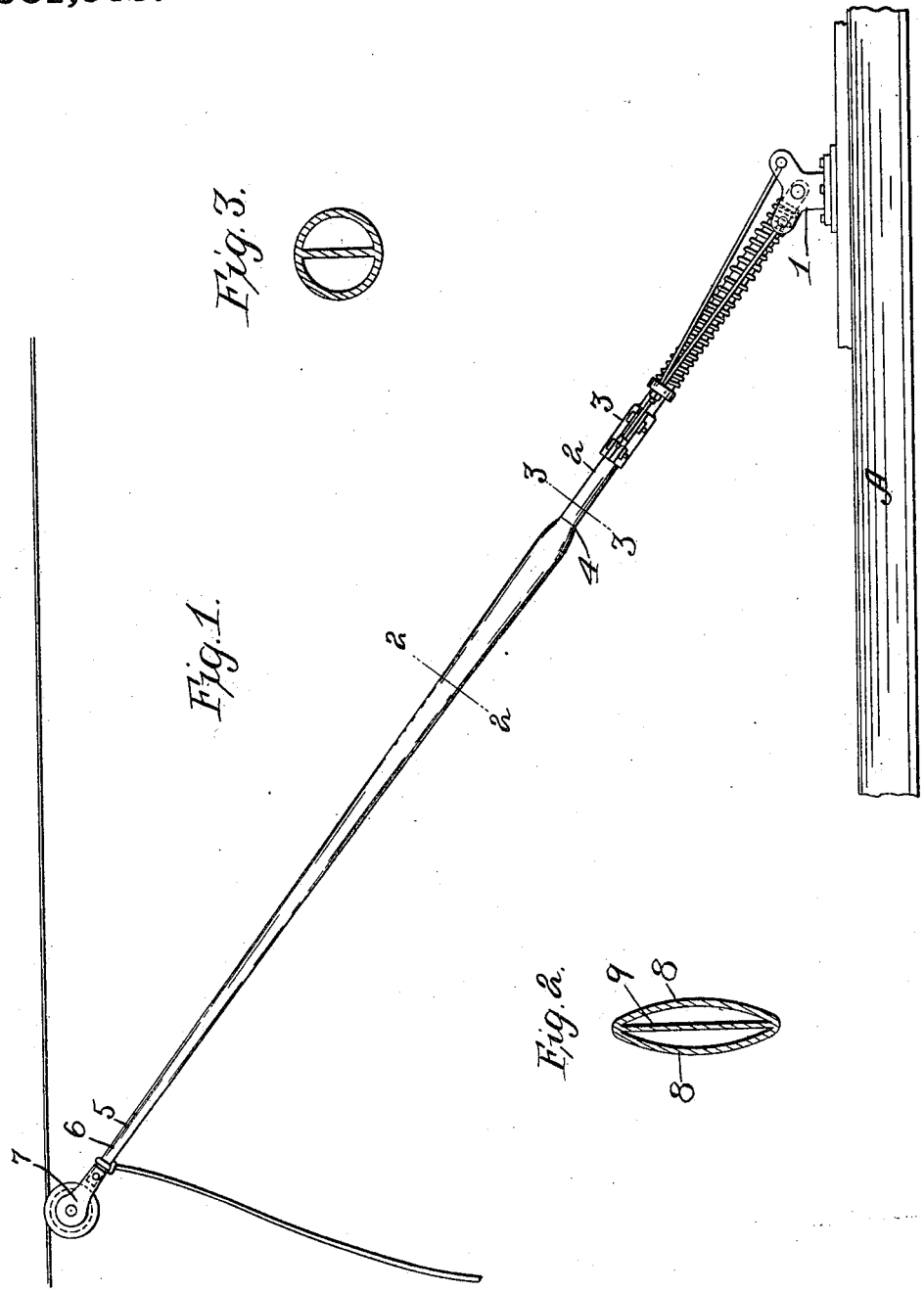
ATTEST.
INVENTOR.
FREDERICK L. CROSS
ATTYS.

UNITED STATES PATENT OFFICE.

FREDERICK L. CROSS, OF ANNAPOLIS, MARYLAND, ASSIGNOR OF ONE-HALF TO HARRY IRA GEESEY, OF ALTOONA, PENNSYLVANIA.

TROLLEY-POLE.

981,535.

Specification of Letters Patent.

Patented Jan. 10, 1911.

Application filed July 6, 1909. Serial No. 506,135.

*To all whom it may concern:*

Be it known that I, FREDERICK L. CROSS, citizen of the United States, residing at Annapolis, Maryland, have invented certain new and useful Improvements in Trolley-Poles, of which the following is a specification.

My invention relates to overhead electric railways, and particularly to a trolley pole and its arrangement in connection with the car.

My object is to provide such a construction and arrangement of pole as will meet the requirements and strains of the service of high speed electric railways.

It is found in practice that an ordinary pole will rupture or become distorted and bent when used on a high speed road, owing to the shock and blows to which the trolley is subject in service, particularly in crossing switches or contacting with other parts of the overhead structure. While my aim is to provide a construction and arrangement of pole in relation to the car, such as will effectually resist the shocks and blows to which the trolley and pole are subjected, I aim also to provide a pole which, while being rigid as regards the longitudinal direction of the car, will yet have flexibility laterally in respect to the car, so that in passing or contacting with parts of the overhead structure the pole will bend laterally and accommodate itself to the overhead work.

The invention consists in the features and combination and arrangement of parts hereinafter described and particularly pointed out in the claims.

In the accompanying drawings, Figure 1 is a side elevation of part of the roof of a car and overhead wire, with a trolley pole built in accordance with my invention, combined therewith. Fig. 2 is a cross sectional view on the line 2—2 of Fig. 1. Fig. 3 is a cross sectional view on the line 3—3 of Fig. 1.

In these drawings, A indicates a portion of the roof of trolley car having mounted thereon a support 1 for the trolley pole which is connected thereto by its cylindrical end 2 fitting in a socket 3, connected with the said support. From the point 4 the trolley pole is flattened and this flattened portion extends to near the top of the pole, for instance to the point 5, where the pole is again provided with a cylindrical portion 6 carrying the harp 7. The cross sectional shape of the pole at its flattened portion is indicated in Fig. 2, it being observed that the configuration here shown presents substantially flattened lateral sides 8, 8, the major axis of the elliptical or substantially elliptical shape being vertical, while the minor axis is arranged horizontally. Within the pole I arrange a partition or main portion 9, consisting of a flat blade or strip of metal welded at its ends to the sides 8, 8, at the upper and lower converging portions of the said sides. These sides may be formed separately and stamped up into the desired form, and they, together with the main portion 9 of the pole, are welded together at their upper and lower edges.

It will be seen that the pole is so arranged on the car and in relation thereto, that the central portion 9 will lie in a vertical plane, passing from front to rear of the car at substantially the center thereof. By this arrangement it will be observed that the strains and shocks and blows to which the trolley and the pole are subjected will be effectually resisted because the vertically disposed portion 9 of the trolley pole will present its edge directly in the plane in which the blows or shocks are delivered. The sides 8 are also arranged substantially vertical and what has been said of the central portion 9 applies also in large measure to the arch shaped sides 8. These sides act as braces for the central portion 9, and this central portion reacts to brace the sides, the whole presenting an elongated cross sectional structure set on edge or in a vertical plane and adapted to prevent rupture or bending of the pole under the severe service to which it is subjected on high speed roads.

While the pole as above constructed and as above arranged in relation to the car and the work to be done, is adapted to present a stiff, strong structure in a direction longitudinally of the car, the arrangement also affords a proper amount of lateral flexion to the pole to enable it to bend laterally in sufficient degree to accommodate itself to the work and to enable it to pass obstructing portions of the overhead structure without damage either to itself or to the said overhead parts. The cylindrical ends of the pole are preferably formed integral with the flat main portion and these cylindrical ends adapt the pole for attachment to the support, as in ordinary practice, and likewise to receive the harp. The main portion 9 of the pole extends throughout these cylindrical portions as indicated at Fig. 3, it being of course of reduced width in respect to the widest part of the main portion of the pole.

An important advantage arises from the use of the laterally flexible pole, in that in making turns under high speed, the trolley will be maintained in connection with the wire, as the pole will give sufficiently when the trolley strikes the turn, and the effect will be that the trolley will be maintained in position instead of jumping from the wire.

I claim as my invention:

1. In combination with a trolley car and its pole support, a hollow pole having cylindrical ends for attachment to the said support and to the harp respectively, the main portion of said pole being flattened laterally and flared in respect to the cylindrical ends, and a partition extending longitudinally throughout the cylindrical and flattened portions of the pole, said partition extending in a longitudinally vertical plane of the car, substantially as described.

2. In combination with a car, a hollow trolley pole having cylindrical ends for attachment to the car and to the harp respectively, the intermediate main portion flattened laterally and flared in relation to the cylindrical ends with a partition extending in the flattened portion and set on edge in the vertical longitudinal plane of the car, substantially as described.

3. In combination with a car, a hollow trolley pole flexible laterally having a main portion or partition therein set on edge in the vertical longitudinal plane of the car, substantially as described.

4. In combination with a car, a hollow trolley pole of substantially elliptical shape in cross section, and having a main central portion in the form of a partition extending along the major axis of the elliptical frame, leaving free spaces on each side and from end to end thereof, said pole having the said central partition extending flatwise in a vertical plane longitudinally of the car, substantially as described.

5. A trolley pole comprising a tubular member having different cross sectional shapes at different points, one portion being flexible laterally and a flat reinforcing rib extending longitudinally of the tubular member, and having its axes of greatest resistance arranged in a vertical plane, substantially as described.

In testimony whereof, I affix my signature in presence of two witnesses.

FREDERICK L. CROSS.

Witnesses:
 HENRY E. COOPER,
 R. E. OURAND.